(12) United States Patent
Mansfield et al.

(10) Patent No.: US 7,667,148 B2
(45) Date of Patent: Feb. 23, 2010

(54) METHOD, DEVICE, AND GRAPHICAL USER INTERFACE FOR DIALING WITH A CLICK WHEEL

(75) Inventors: Philip Andrew Mansfield, Vancouver (CA); Michael Robert Levy, Vancouver (CA)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 11/549,619

(22) Filed: Oct. 13, 2006

(65) Prior Publication Data
US 2008/0276168 A1    Nov. 6, 2008

(51) Int. Cl.
G06F 3/048    (2006.01)
G06F 3/033    (2006.01)
G09G 5/00    (2006.01)

(52) U.S. Cl. .................. 200/5 R; 715/830; 345/184; 345/654

(58) Field of Classification Search .......... 345/619, 345/636, 649, 650, 654, 473, 156, 184; 715/810, 715/864, 830–833; 200/5 R
See application file for complete search history.

(56) References Cited

U.S. PATENT DOCUMENTS

| | | | | |
|---|---|---|---|---|
| 2,794,861 | A * | 6/1957 | Heine | 379/365 |
| 5,748,512 | A | 5/1998 | Vargas | 364/709 |
| 5,801,941 | A | 9/1998 | Bertram | 364/188 |
| 5,883,612 | A * | 3/1999 | Kreitzer | 345/619 |
| 5,963,671 | A | 10/1999 | Comeford et al. | 382/230 |
| 6,011,542 | A | 1/2000 | Durrani et al. | 345/156 |
| 6,323,846 | B1 | 11/2001 | Westerman et al. | 345/173 |
| 6,359,572 | B1 | 3/2002 | Vale | 341/23 |
| 6,407,325 | B2 | 6/2002 | Yi et al. | 84/610 |
| 6,570,557 | B1 | 5/2003 | Westerman et al. | 345/173 |

(Continued)

FOREIGN PATENT DOCUMENTS

EP    0 588 210 A1    3/1994

(Continued)

OTHER PUBLICATIONS

Rotary cell-phone keypad :: halfbakery.com/idea/Rotary_20cell-phone_20keypad; Feb. 2002.*

(Continued)

*Primary Examiner*—Edwin A. Leon
*Assistant Examiner*—Sean Kayes
(74) *Attorney, Agent, or Firm*—Morgan, Lewis & Bockius LLP (57) ABSTRACT

One aspect of the invention involves a computer-implemented method in which a portable communications device with a click wheel and a display detects a plurality of finger contacts with the click wheel. Each finger contact includes an angular displacement of the finger contact on the click wheel between an initial location and a final location of the finger contact. The device displays an image that includes digits arranged in a circle. The image rotates, in response to each finger contact, by an amount determined in accordance with the angular displacement of the finger contact. For each finger contact, the device determines a digit. The determined digit is independent of the initial location of the finger contact on the click wheel. The device performs a task using the determined digits. Exemplary tasks include dialing a telephone number and sending numeric input to a remote computer.

24 Claims, 7 Drawing Sheets

U.S. PATENT DOCUMENTS

| | | | |
|---|---|---|---|
| 6,573,844 B1 | 6/2003 | Venolia et al. | 341/22 |
| 6,597,345 B2 | 7/2003 | Hirshberg | 345/168 |
| 6,654,733 B1 | 11/2003 | Goodman et al. | 706/52 |
| 6,677,932 B1 | 1/2004 | Westerman | 345/173 |
| 6,710,771 B1* | 3/2004 | Yamaguchi et al. | 345/184 |
| 6,760,012 B1 | 7/2004 | Laurila | 345/169 |
| 6,867,965 B2* | 3/2005 | Khoo | 361/679.3 |
| 7,107,147 B2 | 9/2006 | Pascual et al. | 701/200 |
| 7,149,550 B2 | 12/2006 | Kraft et al. | 455/566 |
| 7,286,115 B2 | 10/2007 | Longe et al. | 345/168 |
| 2002/0015024 A1 | 2/2002 | Westerman et al. | 345/173 |
| 2002/0030665 A1 | 3/2002 | Ano | 345/168 |
| 2002/0072394 A1 | 6/2002 | Muramatsu | 455/566 |
| 2003/0070106 A1* | 4/2003 | Kosuda et al. | 713/500 |
| 2003/0076301 A1 | 4/2003 | Tsuk et al. | 345/159 |
| 2003/0104839 A1 | 6/2003 | Kraft et al. | 455/566 |
| 2003/0162569 A1 | 8/2003 | Arakawa et al. | 455/566 |
| 2004/0009788 A1 | 1/2004 | Mantyjarvi et al. | 455/550.1 |
| 2004/0055446 A1 | 3/2004 | Robbin et al. | 84/615 |
| 2004/0070567 A1* | 4/2004 | Longe et al. | 345/156 |
| 2004/0165924 A1 | 8/2004 | Griffin | 400/486 |
| 2004/0185912 A1 | 9/2004 | Mason et al. | 455/566 |
| 2004/0218963 A1 | 11/2004 | Van Diepen et al. | 400/472 |
| 2005/0081164 A1* | 4/2005 | Hama et al. | 715/830 |
| 2005/0125570 A1* | 6/2005 | Olodort et al. | 710/15 |
| 2005/0195159 A1 | 9/2005 | Hunleth et al. | 345/156 |
| 2005/0253818 A1 | 11/2005 | Nettamo | 345/173 |
| 2005/0283724 A1 | 12/2005 | Griffin | 715/532 |
| 2007/0046641 A1 | 3/2007 | Lim | 345/173 |
| 2007/0106732 A1 | 5/2007 | Weis | 709/206 |

FOREIGN PATENT DOCUMENTS

| | | |
|---|---|---|
| EP | 1 510 911 A2 | 3/2005 |
| WO | WO 01/74133 A2 | 10/2001 |
| WO | WO 2005/006442 A1 | 7/2005 |

OTHER PUBLICATIONS

Nokia 7280: Interactive Demostrations :: nokia.com/EUROPE_NOKIA_COM_3/r2/support/tutorials/7280/english/index.html; 2004.*

Nokia 7280 User Manual: nds1. nokia.com/phones/files/guides/Nokia_7280_UG_en.pdf; Nov. 25, 2004.*

Web Archive: web.archive.org/web/*/http://nds1.nokia.com/phones/files/guides/Nokia_7280_UG_en.pdf; Jun. 19, 2009.*

Office Action dated Oct. 28, 2008, for related U.S. Appl. No. 11/459,610.

Office Action dated Nov. 3, 2008, for related U.S. Appl. No. 11/459,612.

Gibbs, K., "I've Got a Suggestion," posted on the Google Blog, Dec. 10, 2004, http://googleblog.blogspot.com.

Google, "Google Suggest FAQ," Google.com, retrieved on Apr. 1, 2009, from http://labs.google.com/suggestfaq.

Liu, J., "At a Loss for Words?", posted on the Google Blog, Aug. 25, 2008, http://googleblog.blogspot.com.

McAlister, J., "News + Suggest Join Forces," Apr. 28, 2006, posted on the Google Blog, http://googleblog.blogspot.com.

Torrone, P., "Google Suggest: The Movie," Dec. 11, 2004, posted on www.engadget.com.

Office Action dated Feb. 4, 2009, for related U.S. Appl. No. 11/459,609.

Office Action dated Apr. 7, 2009, for related U.S. Appl. No. 11/459,612.

Casario, M., "Hands on Macromedia World: Touch Screen Keypad for Mobile Phone by DoCoMo," http://casario.blogs.com/mmworld/2005/10/touch_screen_ ke.html, printed Nov. 18, 2005, 1 page.

Day, B., "Will Cell Phones Render iPods Obsolete?" http://weblogs.javanet/pub/wig/883, printed Dec. 12, 2005, 3 pages.

Delta II™ Keypads, "Introducing the Ultimate Smartphone Keypad", http://www.chicagologic.com, printed Nov. 18, 2005, 2 pages.

DigitWireless, "Fastap™ Keypads Redefine Mobile Phones," http://www/digitwireless.com printed Nov. 18, 2005, 9 pages.

DigitWireless, "Fastap™," http://www.digitwireless.com/about/faq.html, Dec. 6, 2005, 5 pages.

MobileTouch "Synaptics: Handy Wie Einen iPod Bedienen," Sep. 21, 2004, http://www.golem.de/0409/33706.html, 2 pages.

Nokia, "7280 Interaktive Demos" screenshot Nov. 25, 2005, http://web.archive.org/web/2005112502636/europe.nokia.com/support/tutorials/7280/german/index.htm, 2 pages.

Nokia, "7280 Bedienungsanleitung" 2005, htpp://web.archive.org/web/20051222023851/http://ndsl.nokia.com/phones/files/guides/nokia7280___UDG-de.pdf, pp. 1-150.

O'Neal, W., "Smart Phones with Hidden Keyboards," http://msc.com/4250-6452_16-6229969-1.html, printed Nov. 18, 2005, 3 pages.

Phoneyworld, "You Heard of Touch Screens Now Check Out Touch Keys" http://www.phoneyworld.com, printed Nov. 18, 2005, 2 pages.

Sears, A., et al., "Data Entry for Mobile Devices Using Soft Keyboards: Understanding the Effects of Keyboard Size and User Tasks," Abstract, Int'l Journal of Human-Computer Interaction, 2003, vol. 16, No. 2, 1 page.

Solutions for Humans, "Compare Keyboards with the Keyboard Compatibility Chart, Learn more About Alternative Keyboards," http:www.keyalt.com/kkeybrdp.htm, printed Dec. 8, 2005, 5 pages.

"T9® Text Input for Keypad Devices," http://tegic.com.

Technology Loan Catalog, "Devices," http://www.tsbvi.edu/outreach/techloan/catalog.html, printed Dec. 8, 2005, 9 pages.

Textually, "LG Develops New Touch Pad Cell Phones," http://textually.org/textually/archives/2005/06/009903.htm, printed Nov. 18, 2005, 1 page.

Textually, "Microsoft New-Smart Phone Interface: Your Thumb," http://www.textually.org.org, printed Nov. 18, 2005, 2 pages.

Textually, "Samsung Releases Keyboard Phone in US," http://www.textually.org/textually/archives/2005/11/010482.htm, printed Nov. 18, 2005, 1 page.

WikiPodLinux, "Text Input Methods," http://ipodlinux.org/Tex_Input_Methods, printed Dec. 5, 2005, 18 pages.

International Search Report for International Application No. PCT/US2007/060120, mailed May 29, 2007. (Related application).

Office Action dated Aug. 6, 2009, for related U.S. Appl. No. 11/459,612.

* cited by examiner

| Detect a plurality of finger contacts with the click wheel, wherein each finger contact includes an angular displacement of the finger contact on the click wheel between an initial location and a final location of the finger contact on the click wheel | ⟿ 302 |

| Display an image that includes digits arranged in a circle, wherein the image rotates in response to each finger contact and the amount of rotation is determined in accordance with the angular displacement of the finger contact | ⟿ 304 |

| For each finger contact, determine a digit, wherein the determined digit is independent of the initial location of the finger contact on the click wheel | ⟿ 306 |

| Perform a task using the determined digits | ⟿ 308 |

METHOD, DEVICE, AND GRAPHICAL USER INTERFACE FOR DIALING WITH A CLICK WHEEL

TECHNICAL FIELD

The disclosed embodiments relate generally to portable communications devices, and more particularly, to portable communications devices that include a click wheel.

BACKGROUND

As portable communications devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Accordingly, there is a need for more transparent and intuitive user interfaces for portable communication devices.

SUMMARY

The above deficiencies and other problems associated with user interfaces for portable communications devices are reduced or eliminated by the disclosed devices that use a click wheel to perform tasks, such as dialing telephone numbers.

One aspect of the invention involves a computer-implemented method in which a portable communications device with a click wheel and a display detects a plurality of finger contacts with the click wheel. Each finger contact includes an angular displacement of the finger contact on the click wheel between an initial location and a final location of the finger contact on the click wheel. The device displays an image that includes digits arranged in a circle. The image rotates in response to each finger contact by an amount determined in accordance with the angular displacement of the finger contact. For each finger contact, the device determines a digit. The determined digit is independent of the initial location of the finger contact on the click wheel. The device performs a task using the determined digits. Exemplary tasks include dialing a telephone number and sending numeric input to a remote computer.

Another aspect of the invention involves a graphical user interface (GUI) on a portable communications device with a click wheel and a display. The GUI has an image that includes digits arranged in a circle. The image rotates in response to each finger contact in a plurality of finger contacts. Each finger contact includes an angular displacement of the finger contact on the click wheel between an initial location and a final location of the finger contact on the click wheel. For each finger contact, the amount of rotation of the image is determined in accordance with the angular displacement of the finger contact. For each finger contact, a digit is determined. The determined digit is independent of the initial location of the finger contact on the click wheel. A task is performed using the determined digits.

Another aspect of the invention involves a portable communications device. The device includes a click wheel, a display, one or more processors, memory, and a program The program is stored in the memory and configured to be executed by the one or more processors. The program includes instructions for detecting a plurality of finger contacts with the click wheel. Each finger contact includes an angular displacement of the finger contact on the click wheel between an initial location and a final location of the finger contact on the click wheel. The program also includes instructions for displaying an image that includes digits arranged in a circle. The image rotates in response to each finger contact by an amount determined in accordance with the angular displacement of the finger contact. The program also includes, for each finger contact, instructions for determining a digit. The determined digit is independent of the initial location of the finger contact on the click wheel. The program also includes instructions for performing a task using the determined digits.

Another aspect of the invention involves a computer-program product that includes a computer readable storage medium and a computer program mechanism embedded therein. The computer program mechanism includes instructions, which when executed by a portable communications device with a click wheel and a display, cause the device to: detect a plurality of finger contacts with the click wheel, wherein each finger contact includes an angular displacement of the finger contact on the click wheel between an initial location and a final location of the finger contact on the click wheel; display an image that includes digits arranged in a circle, wherein: the image rotates in response to each finger contact by an amount determined in accordance with the angular displacement of the finger contact; for each finger contact, determine a digit, wherein the determined digit is independent of the initial location of the finger contact on the click wheel; and perform a task using the determined digits.

Another aspect of the invention involves a portable communications device with a click wheel and a display, comprising: means for detecting a plurality of finger contacts with the click wheel, wherein each finger contact includes an angular displacement of the finger contact on the click wheel between an initial location and a final location of the finger contact on the click wheel; means for displaying an image that includes digits arranged in a circle, wherein: the image rotates in response to each finger contact by an amount determined in accordance with the angular displacement of the finger contact; for each finger contact, means for determining a digit, wherein the determined digit is independent of the initial location of the finger contact on the click wheel; and means for performing a task using the determined digits.

Thus, the invention provides a user interface for inputting data (e.g., telephone numbers) that is reminiscent of, but improves upon, the mechanical rotary dial found on old landline telephones.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks are not described in detail to avoid obscuring aspects of the present invention.

Embodiments of user interfaces and associated processes for using a portable communication device are described. The user interface includes a click wheel. A click wheel is a user-interface device that may provide navigation commands based on an angular displacement of the wheel or a point of contact with the wheel by a user of the device. In some embodiments, the click wheel is a physical device that is separate from a display (e.g., FIG. 2A). In other embodiments, the click wheel is virtual device that is displayed on a touch screen or other display (e.g., FIG. 2B). A click wheel may also be used to provide a user command corresponding to selection of one or more items, for example, when the user of the device presses down on at least a portion of the wheel or the center of the wheel. For simplicity, in the discussion that follows, a portable communications device (e.g., a cellular telephone that may also contain other functions, such as SMS (also called text messaging), PDA and music player functions) that includes a click wheel is used as an exemplary embodiment. It should be understood, however, that the user interfaces and associated processes may be applied to other devices, such as personal computers and laptops, which may include one or more other user-interface devices.

The device may support a variety of applications, such as one or more telephone applications, a text message application and a music player. The music player may be compatible with one or more file formats, such as MP3 and/or AAC. In an exemplary embodiment, the device includes an iPod music player (trademark of Apple Computer, Inc.).

The various applications that may be executed on the device may use at least one common physical user-interface device, such as a physical click wheel or a touch screen with a virtual click wheel. One or more functions of the click wheel as well as corresponding information displayed on the device may be adjusted and/or varied from one application to the next and/or within a respective application. In this way, a common physical architecture (such as the click wheel or the touch screen) of the device may support the variety of applications with user interfaces that are intuitive and transparent to a user.

Figure 1:
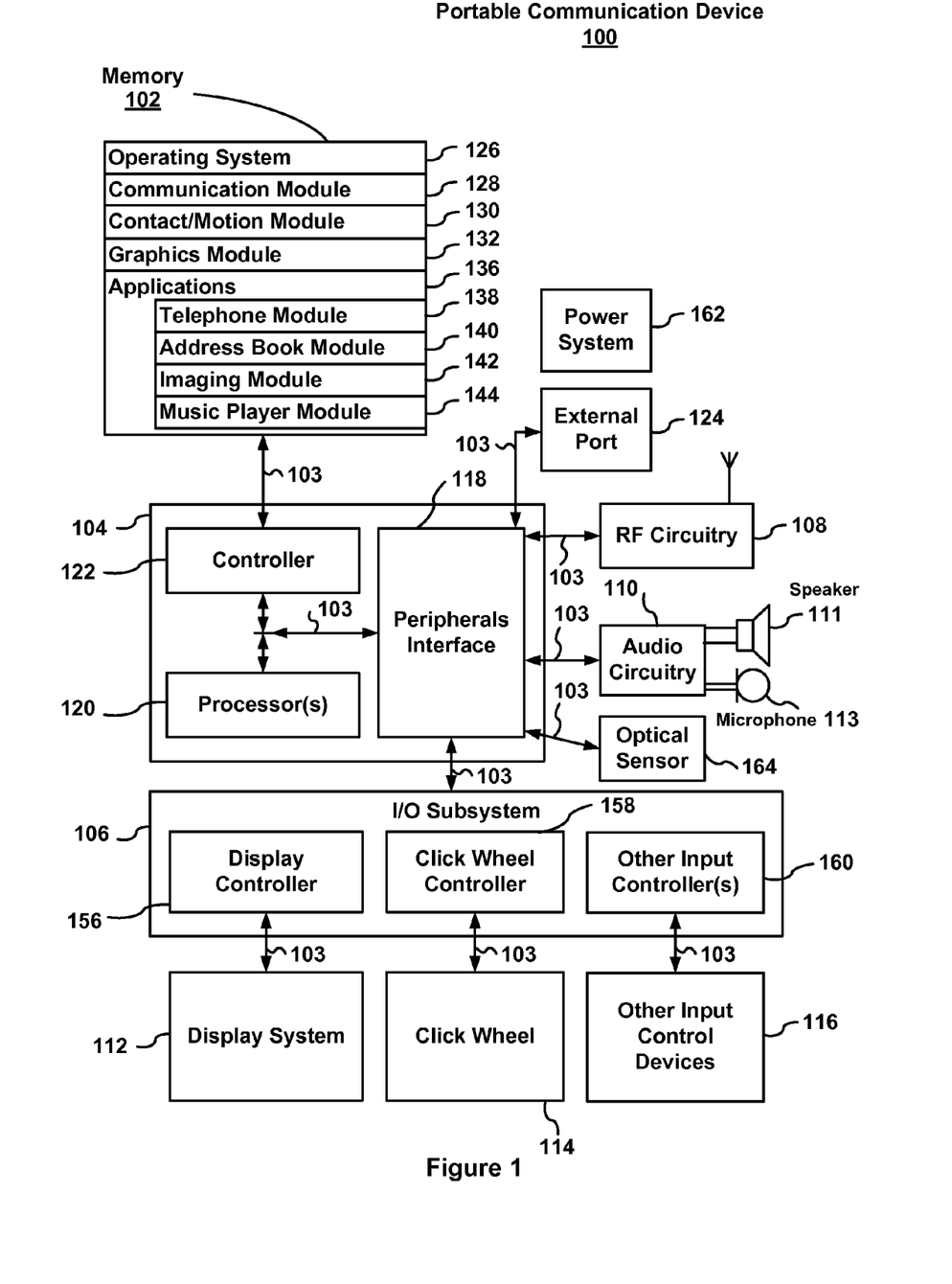
FIG. 1 is a block diagram illustrating a portable communications device in accordance with some embodiments.

Attention is now directed towards embodiments of the device. FIG. 1 is a block diagram illustrating a portable communications device 100 in accordance with some embodiments. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, a display system 112 (which may include a touch screen), a click wheel 114, other input or control devices 116, and an external port 124. The device 100 may optionally include one or more optical sensors 164. These components may communicate over one or more communication buses or signal lines 103. The device 100 may be any portable electronic device, including but not limited to a handheld computer, a tablet computer, a mobile telephone, a media player, a personal digital assistant (PDA), or the like, including a combination of two or more of these items, provided the device includes voice communication capabilities (e.g., telephony).

It should be appreciated that the device 100 is only one example of a portable communications device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high speed random access memory and may also include non-volatile memory, such as one or more magnetic disk storage devices, flash memory devices, or other non-volatile solid state memory devices. In some embodiments, memory 102 may further include storage remotely located from the one or more processors 120, for instance network attached storage accessed via the RF circuitry 108 or the external port 124 and a communications network (not shown) such as the Internet, intranet(s), Local Area Networks (LANs), Wide Local Area Networks (WLANs), Storage Area Networks (SANs) and the like, or any suitable combination thereof. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display system 112, the click wheel 114 and other input/control devices 116, to the peripherals interface 118. The I/O subsystem 106 may include a display controller 156, a click wheel controller 158 and one or more input controllers 160 for other input or control devices. The one or more input controllers 160 receive/send electrical signals from/to other input or control devices 160. The other input/control devices 160 may include physical buttons (e.g., push buttons, rocker buttons, etc.), dials, slider switches, joysticks, and so forth.

The display system 112 provides an output interface and/or an input interface between the device and a user. The display controller 156 receives and/or sends electrical signals from/to the display system 112. The display system 112 displays visual output to the user. The visual output may include text, icons, graphics, video, and any combination thereof. In some embodiments, some or all of the visual output may correspond to user-interface objects, further details of which are described below.

In some embodiments, such as those that include a touch screen, the display system 112 also accepts input from the user based on haptic and/or tactile contact. In embodiments with a touch screen, the display system 112 forms a touch-sensitive surface that accepts user input. In these embodiments, the display system 112 and the display controller 156 (along with any associated modules and/or sets of instructions in memory 102) detect contact (and any movement or breaking of the contact) on the display system 112 and converts the detected contact into interaction with user-interface objects, such as one or more soft keys or a virtual click wheel, that are displayed on a touch screen. In an exemplary embodiment, a point of contact between a touch screen in the display system 112 and the user corresponds to one or more fingers of the user.

In embodiments with a touch screen, the touch screen in the display system 112 may use LCD (liquid crystal display) technology, or LPD (light emitting polymer display) technology, although other display technologies may be used in other embodiments. A touch screen in the display system 112 and the display controller 156 may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth.

In some embodiments, in addition to a touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

The device 100 includes a physical or virtual click wheel 114. A user may interact with one or more graphical objects (henceforth referred to as icons) displayed in the display system 112 by rotating the click wheel 114 or by moving a point of contact with the click wheel 114 (e.g., where the amount of movement of the point of contact is measured by its angular displacement with respect to a center point of the click wheel). The click wheel 114 may also be used to select one or more of the displayed icons. For example, the user may press down on at least a portion of the click wheel 114 or an associated button. User commands and navigation commands provided by the user via the click wheel 114 may be processed by the click wheel controller 158 as well as one or more of the modules and/or sets of instructions in memory 102. For a virtual click wheel, the click wheel 114 and click wheel controller 158 may be part of the display system 112 and the display controller 156, respectively. For a virtual click wheel, the click wheel may be either an opaque or semitransparent object that appears and disappears on a display in response to user interaction with the device. In some embodiments, a virtual click wheel is displayed on the touch screen of a portable electronic device and operated by user contact with the touch screen. In other embodiments, a virtual click wheel is displayed on a computer screen and operated with a mouse, touch pad, or other pointing device.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to the peripherals interface 118. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 142, the optical sensor 164 may capture still images or video.

In some embodiments, the software components stored in memory 102 may include an operating system 126, a communication module (or set of instructions) 128, a contact/motion module (or set of instructions) 130, a graphics module (or set of instructions) 132, and one or more applications (or set of instructions) 136. The applications module 136 may include a telephone module (or set of instructions) 138, an address book module (or set of instructions) 140, an imaging module (or set of instructions) 142, and/or a music player module (or set of instructions) 144.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the click wheel 114 (in conjunction with the click wheel controller 158) and/or a touch screen in the display system 112 (in conjunction with the display controller 156). The contact/motion module 130 includes various software components for performing various operations related to detection of contact, such as determining if contact has occurred, determining if there is movement of the contact and tracking the movement across the click wheel 114 and/or a touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. In some embodiments, the contact/motion module 130 and the display controller 156 also detects contact on a touchpad.

The graphics module 132 includes various known software components for rendering and displaying graphics on the display system 112, including components for changing the intensity of graphics that are displayed. Note that the term "graphics" includes any object that can be displayed to a user, including without limitation text, web pages, icons (such as user-interface objects including soft keys), digital images, videos, animations and the like.

In addition to the telephone module 138, the address book module 140 and/or the imaging module 142, the one or more applications 136 may include any applications installed on the device 100, including without limitation, a browser, email, instant messaging, text messaging, word processing, keyboard emulation, widgets, JAVA-enabled applications, encryption, digital rights management, voice recognition, voice replication, location determination capability (such as that provided by the Global Positioning System (GPS)), etc.

In conjunction with the RF circuitry 108, the audio circuitry 110, the speaker 111, the microphone 113, the display system 112, the display controller 156, the click wheel 114 and/or the click wheel controller 158, the telephone module 138 may be used to enter a sequence of characters corresponding to a telephone number, access one or more telephone numbers in the address book 140, modify a telephone number that has been entered, dial a respective telephone number, conduct a conversation and disconnect or hang up when the conversation is completed. The telephone module 138 may also be used to receive a second call while a first call is already ongoing, without disconnecting the first call, or conduct a conference call.

In conjunction with the display system 112, the display controller 156, the click wheel 114 and/or the click wheel controller 158, the address book module 140 may be used to manage an address book or contact list 144, including adding a name to the address book 144, deleting a name from the address book 144, associating a telephone number or other information with a name, associating an image with a name, categorizing and sorting names, and so forth.

In conjunction with the display system 112, the display controller 156, the click wheel 114, the click wheel controller 158, and the optical sensor(s) 164, the imaging module 142 may be used to capture still images or video (including a video stream) 146 and store them into memory 102, modify characteristics of a still image or video, or delete a still image or video from memory 102.

In some embodiments, the device 100 is a device where operation of a predefined set of functions on the device is performed exclusively or primarily through the click wheel 114. By using the click wheel 114 as the primary input/control device for operation of the device 100, the number of physical input/control devices (such as push buttons, dials, and the like) on the device 100 may be reduced.

Figure 2A:
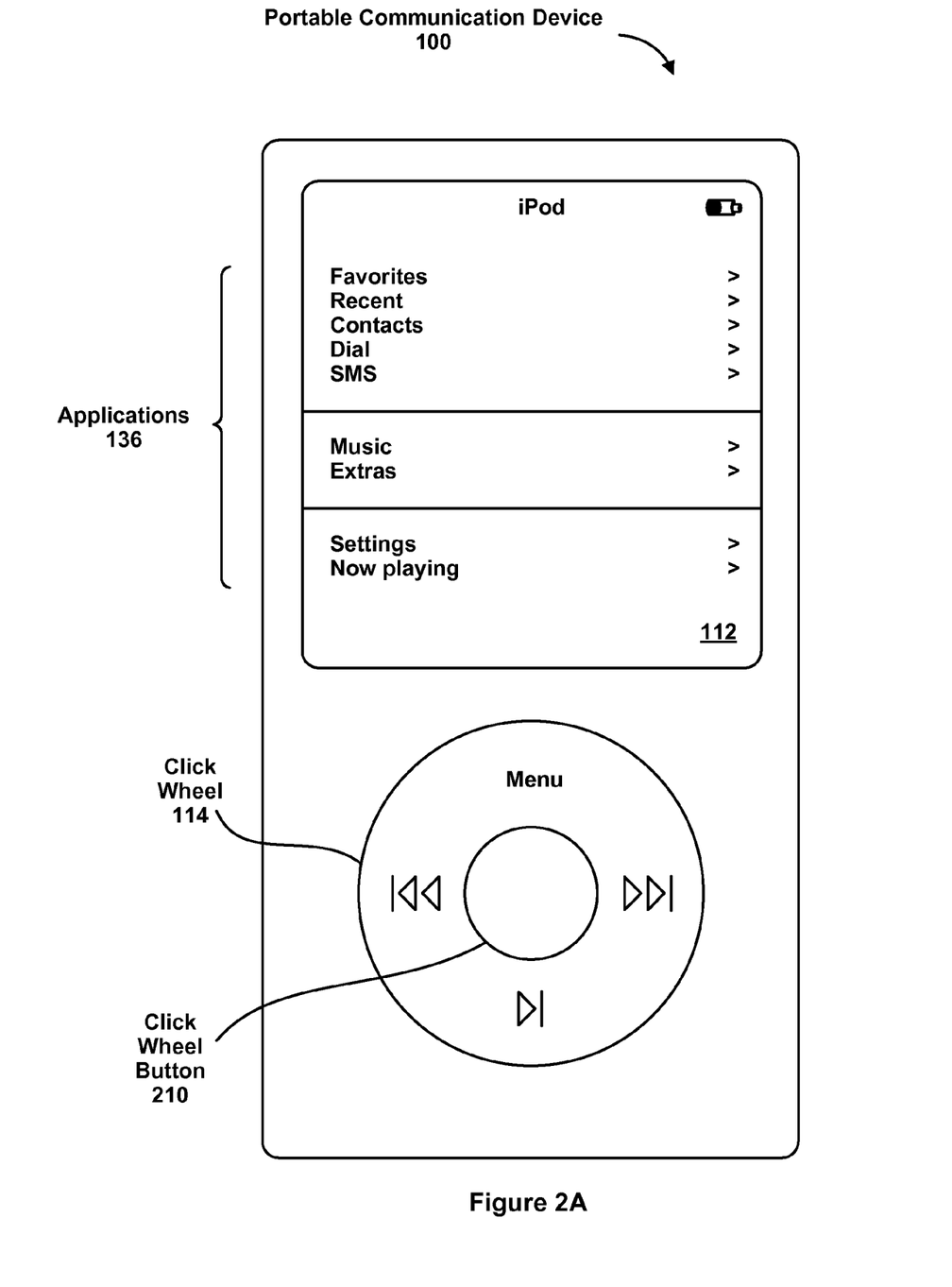
FIG. 2A illustrates a portable communications device having a physical click wheel input device in accordance with some embodiments.
Figure 2B:
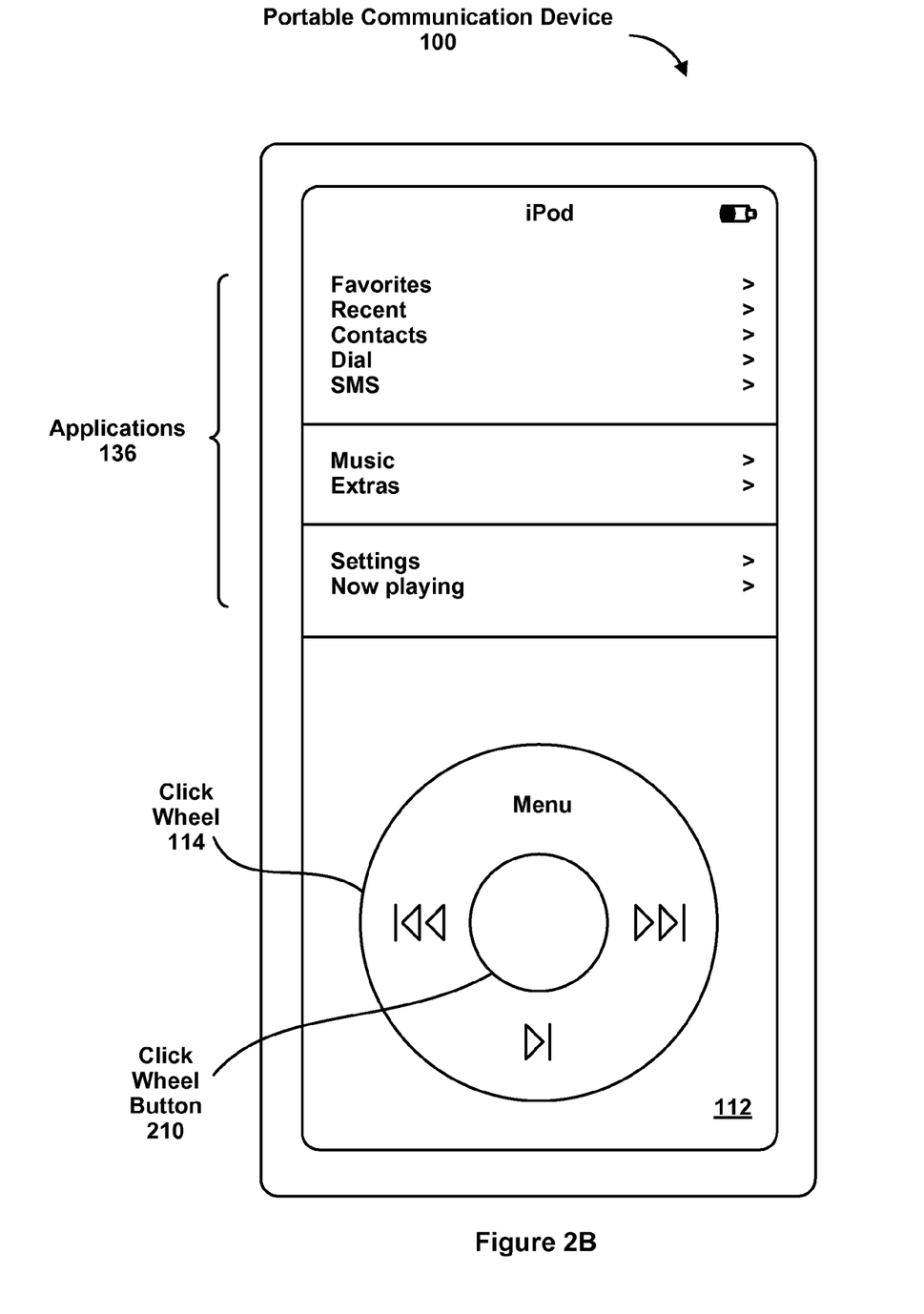
FIG. 2B illustrates a portable communications device having a virtual click wheel input device in accordance with some embodiments.

FIG. 2A illustrates a portable communications device 100 having a physical click wheel input device in accordance with some embodiments. In FIG. 2A, device 100 includes a click wheel 114 and a separate display 112. FIG. 2B illustrates a portable communications device having a virtual click wheel input device in accordance with some embodiments. In FIG. 2B, device 100 includes a virtual click wheel 114 displayed on a touch screen display 112. The click wheel constitutes an interface for receiving user commands (such as selection of one of more items and/or icons that are displayed on the display 112) and/or navigation commands (which may, for example, control scrolling through the items and/or icons that are displayed on the display 112). The user may use the click wheel 114 by touching it (making a point of contact) and then moving the point of contact while maintaining contact. The angular displacement of the user's point of contact may indicate a navigation command to scroll through the items and/or icons that are displayed on the display 112. In an exemplary telephone application the angular displacement of the point of contact is used to rotate an image that includes digit icons arranged in a circle (an image that may resemble a rotary telephone dial). By pressing down on the click wheel 114, or on a click wheel button 210 (e.g., at the center of the click wheel), the user may select one or more items and/or icons that are displayed on the display 112. Thus, a pressing down gesture may indicate a user command corresponding to selection. Alternatively, breaking contact with a click wheel image on a touch screen surface may indicate a user command corresponding to selection. The angular displacement of the point of contact may also be used for selecting digit icons or other symbols arranged in a circle in other applications as well.

The device 100 may display a menu or hierarchy of the applications that may be executed or run on the device 100. For example, the displayed menu or hierarchy for the applications may include 'Favorites' for popular applications for this user; 'Recent' for listing the most recent calls that have been made, answered, and/or missed; 'Contacts' (which corresponds to the address book 140 in FIG. 1); 'Dial' (which corresponds to the telephone module 138 in FIG. 1) and 'SMS'. The menu or hierarchy may also include 'Music', 'Extras', 'Settings' and 'Now playing' icons that correspond to a music player module. The display 112 may also convey other information, such as an icon that indicates a remaining stored power level for the device 100.

Figure 3:
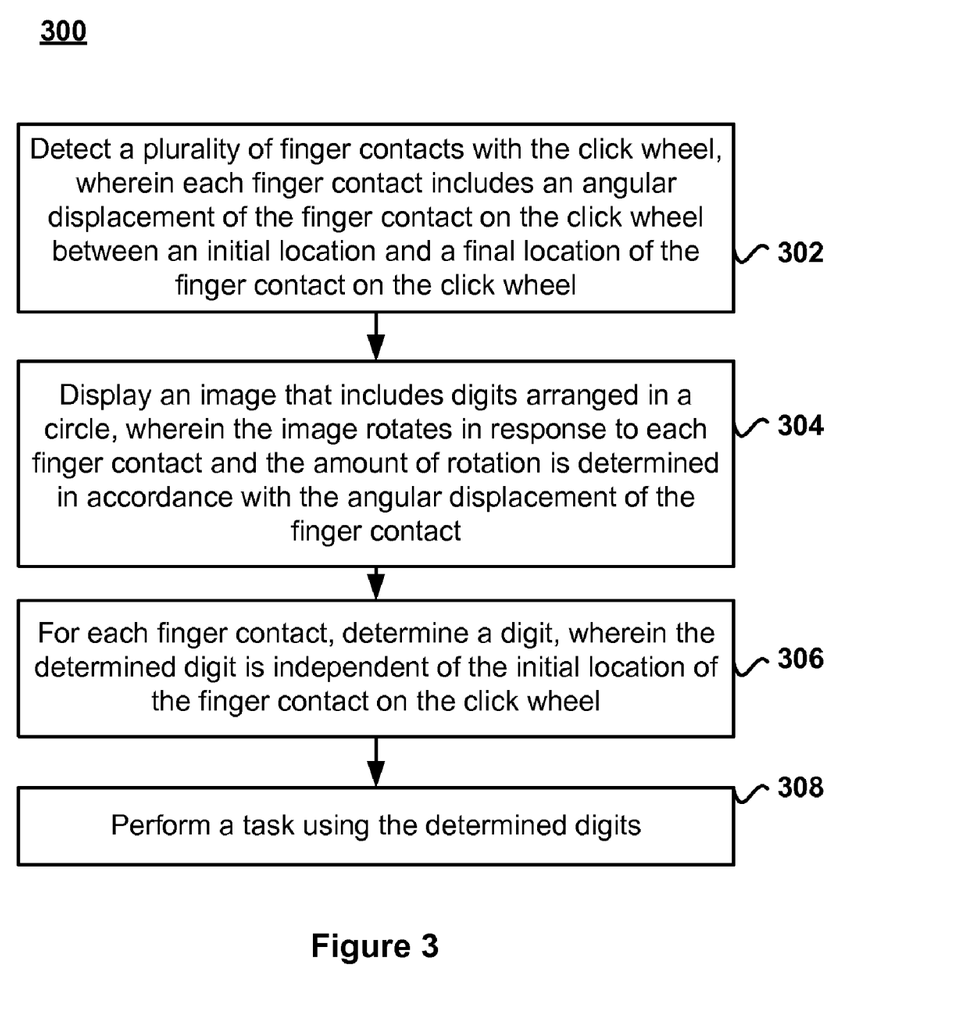
FIG. 3 is a flowchart illustrating a method of receiving and using numeric input in accordance with some embodiments.

FIG. 3 is a flowchart illustrating a method of receiving and using numeric input in accordance with some embodiments. The processes shown in FIG. 3 (or subsets or supersets thereof) are performed by the portable communications device 100 (FIGS. 1 and 2). It will be appreciated by those of ordinary skill in the art that one or more of the acts described may be performed by hardware, software, or a combination thereof. In addition, it will be appreciated by those of ordinary skill in the art that some of the processes shown in FIG. 3 (or subsets or supersets thereof) can be performed in a different order. FIG. 3 is described further below.

Figure 4A:
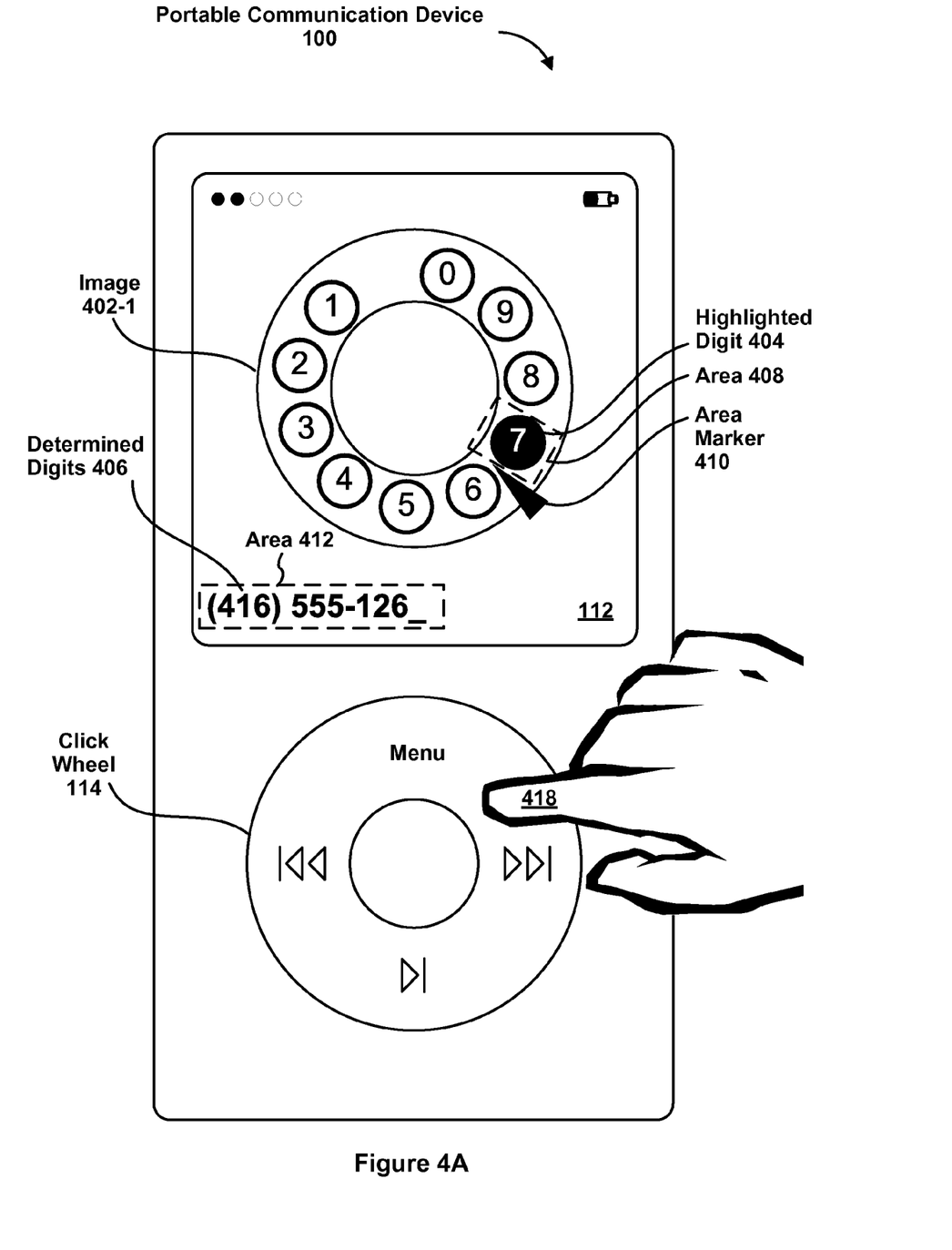
FIG. 4A-4C illustrate exemplary user interfaces for receiving and using numeric input in accordance with some embodiments.
Figure 4B:
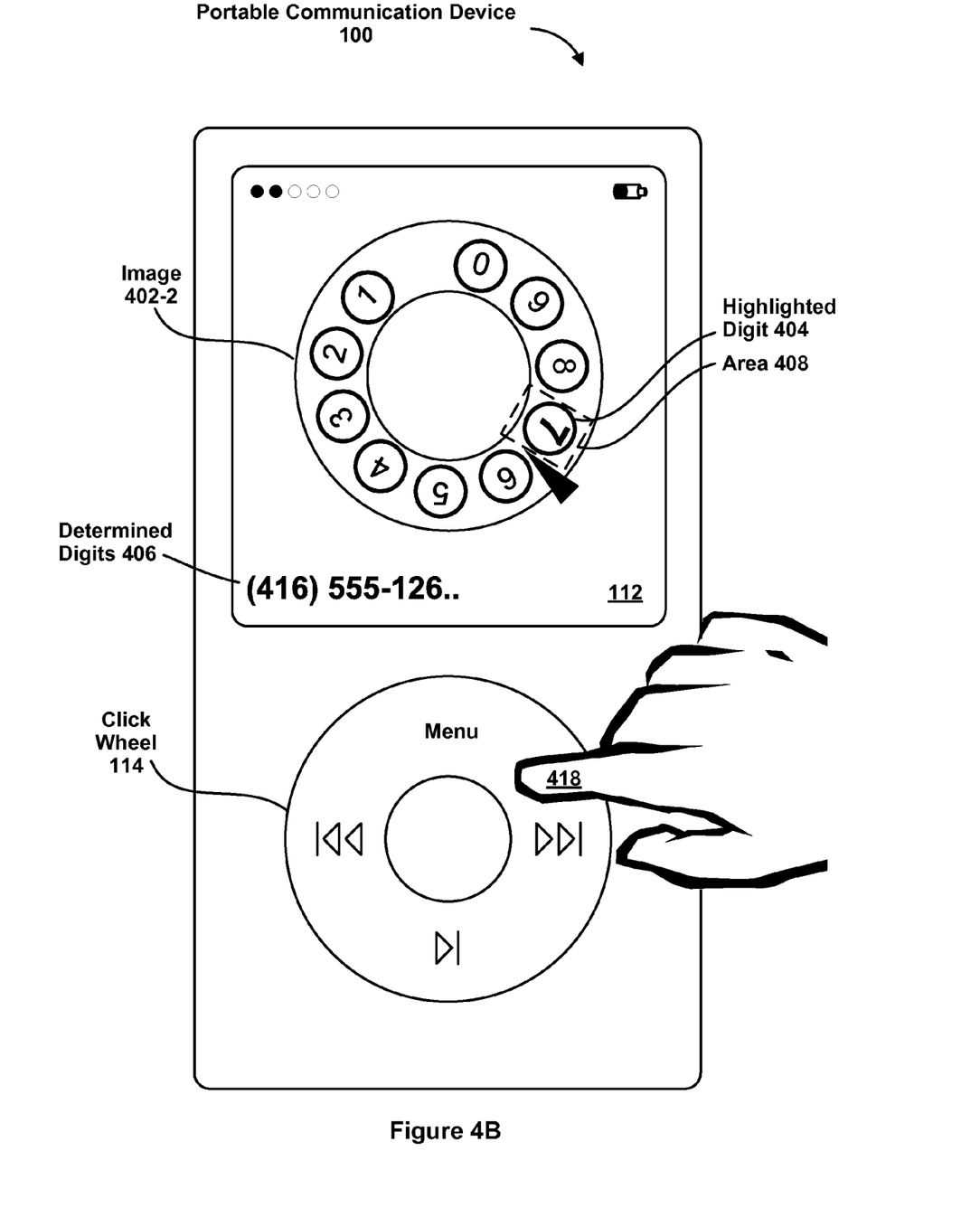
Figure 4C:
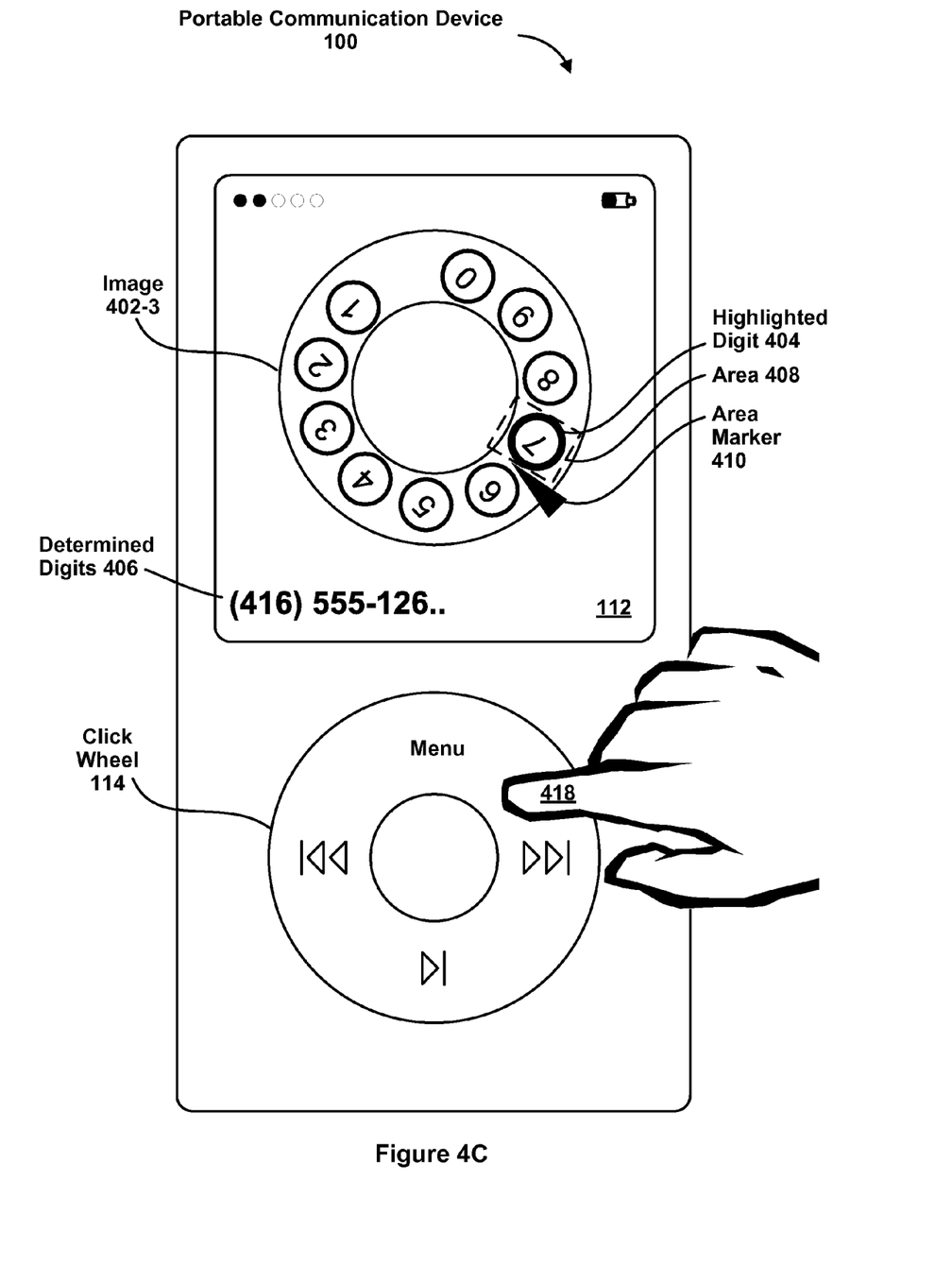

FIG. 4A-4C illustrate exemplary user interfaces for receiving and using numeric input in accordance with some embodiments. In some embodiments, a GUI in display 112 includes the following elements, or a subset or superset thereof:

image 402 that includes digits (e.g., 0-9) displayed in a circle;

a digit 404 that is highlighted if it is in a predefined area 408 of display, such as adjacent to area marker 410; and a sequence of determined digits 406 (e.g., a telephone number or portion thereof entered by a user).

In some embodiments, the digits in image 402 maintain their vertical orientation with respect to display 112 as image 402 rotates (e.g., 402-1). In some other embodiments, the digits in image 402 do not maintain their vertical orientation with respect to display 112 as image 402 rotates (e.g., 402-2 and 402-3).

Contact/motion module 130, in conjunction with click wheel controller 158, detects (302) a plurality of finger contacts with click wheel 114. When a finger contact includes a digital dialing gesture, the finger contact includes an angular displacement of the finger contact on the click wheel 114 between an initial location and a final location of the finger contact on the click wheel. The initial location is a finger touch-down location and the final location is a finger lift-off location. The finger contact may be made with the user's thumb, index finger (e.g., 418, which is not drawn to scale), or any other finger.

While the device is in a telephone number entry or dialing mode (or in any other number entry mode), the contact/motion module 130 may also detect finger contacts (e.g., taps or touches having no angular displacement, and/or finger contacts having angular displacements less than a predefined minimum threshold) that are not indicative of entered digits. These other finger contacts are processed in accordance with their context and the characteristics of the finger contact. In some cases, a finger contact that is not indicative of an entered digit may be ignored by the device, for example if the finger is deemed to be an accidental contact. Other finger contacts may be processed by the device as commands (e.g., a command to delete the last entered digit, a command to erase all entered digits, a command to dial the entered string of digits, etc.) when appropriate. Except where otherwise indicated, the term "finger contact" is used herein to mean finger contacts that are indicative of entered digits.

Display 112 displays (304) an image 402 that includes digits arranged in a circle. The image 402 rotates in response to each finger contact, and the amount of rotation is determined in accordance with the angular displacement of the finger contact. In some embodiments, each digit in image 402 is circled, which makes the image look more like a rotary dial.

For each finger contact, telephone module 138, in conjunction with contact/motion module 130, determines (306) a digit. The determined digit is independent of the initial location of the finger contact on the click wheel. This independence makes entry of numeric data simpler and faster than on a conventional rotary dial telephone because the user does not have to start with his or her finger in a particular location on the click wheel to enter a particular digit.

In some embodiments, for each finger contact, the determined digit corresponds to a highlighted digit (e.g., 404) in image 402. The digit may be highlighted in a wide variety of ways, such as by changing the brightness, color, and/or shading of the digit and/or the area around the digit (e.g., a circular area around the digit). FIGS. 4A-4C illustrate three exemplary types of highlighting for the "7" digit icon. In some embodiments, the highlighted digit is located in a predetermined area 408 of the display (e.g., next to area marker 410). In some embodiments, device 100 provides feedback when the highlighted digit in the predetermined area 408 of the display is changed. In some embodiments, the feedback is visual (e.g., the movement of a digit and the circular area around the digit displays a slight jerk as these features enter area 408 and/or the movement of these features out of area 408 is fractionally delayed). In some embodiments, the feedback is an audible signal (e.g., via speaker 111) and/or a haptic signal (e.g., a vibration). In some embodiments, the audible signal is a click sound (e.g., as a new digit enters area 408). The visual, auditory, and/or haptic feedback assists the user in selecting the desired digit for input.

In some embodiments, for each contact, the determined digit is based on the angular displacement of the finger contact (e.g., when lift-off of the finger contact is detected). In some embodiments, the angular displacement is clockwise or counterclockwise. Data entry using either clockwise or counterclockwise finger contacts allows users to enter data faster than with conventional rotary dialing, which only allows clockwise finger rotation to enter digits. In some embodiments, at least one of the determined digits is based on a counterclockwise angular displacement.

In some embodiments, display 112 displays the determined digits 406 in a predetermined area (e.g., 412).

In some embodiments, contact/motion module 130, in conjunction with click wheel controller 158, detects an input that corresponds to a request to delete a determined digit (e.g., the last digit entered in determined digits 406). In some embodiments, this input is the user clicking on the rewind symbol (|<<) on click wheel 114. In response to this input, the determined digit is deleted. Repeating this process removes additional digits from the sequence of determined digits 406.

Device 100 performs (308) a task or action using the determined digits. In some embodiments, performing (308) the task corresponds to device 100 dialing a telephone number. In some embodiments, performing the task corresponds to device 100 sending numeric input (e.g., the determined digits) to a remote computer.

In some embodiments, contact/motion module 130, in conjunction with click wheel controller 158, detects an input (e.g., the user activating click wheel button 210) that corresponds to a request to transmit a signal corresponding to the determined digits 406. The signal may be used to provide numeric input to a remote computer. For example, the signal may provide numbers to an interactive voice response unit, such as numbers to navigate a voice menu or to provide a credit card number, social security number or other numeric data.

In some embodiments, contact/motion module 130, in conjunction with click wheel controller 158, detects an input (e.g., the user activating click wheel button 210) that corresponds to a request to dial the determined digits. In response, telephone module 138 dials the determined digits. In some embodiments, the input that corresponds to the request to dial the determined digits is a click on a click wheel button 210.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a portable communications device with a click wheel and a display,
    detecting a plurality of sequential finger contacts with the click wheel, wherein each finger contact includes:
        an initial location of the finger contact on the click wheel,
        a final location of the finger contact on the click wheel, and
        an angular displacement of the finger contact on the click wheel between the initial location and the final location of the finger contact on the click wheel;
    displaying a image that includes digits arranged in a circle, wherein the image rotates by an amount determined in accordance with the angular displacement of the finger contact such that a digit of the image is highlighted in a fixed predetermined position of the circle;
    for each finger contact, determining the highlighted digit, wherein the determined highlighted digit is independent of the initial location of the finger contact on the click wheel;
    displaying the determined digits in a second predetermined area of the display;
    detecting an input that corresponds to a request to perform an action with the determined digits; and
    performing the requested action.

2. A computer-implemented method, comprising: at a portable communications device with a click wheel and a display,
    detecting a plurality of sequential finger contacts with the click wheel, wherein each finger contact includes an angular displacement of the finger contact on the click wheel between an initial location and a final location of the finger contact on the click wheel;
    displaying an image that includes digits arranged in a circle, wherein the image rotates in response to each finger contact by an amount determined in accordance with the angular displacement of the finger contact such that a digit of the image is highlighted in a fixed predetermined position of the circle;
    for each finger contact, determining the highlighted digit, wherein the determined highlighted digit is independent of the initial location of the finger contact on the click wheel; and
    performing a task using the determined digits.

3. The method of claim 2, wherein each digit in the image is circled.

4. The method of claim 2, further comprising providing feedback when the highlighted digit in the predetermined area of the display is changed.

5. The method of claim 4, wherein the feedback is an audible signal and/or a haptic signal.

6. The method of claim 5, wherein the audible signal is a click sound.

7. The method of claim 2, wherein, for each contact, the determined highlighted digit is based on the angular displacement of the finger contact.

8. The method of claim 7, wherein the angular displacement is clockwise or counterclockwise.

9. The method of claim 8, wherein at least one of the determined digits is based on a counterclockwise angular displacement.

10. The method of claim 2, further comprising displaying the determined digits.

11. The method of claim 2, further comprising detecting an input that corresponds to a request to delete a determined digit and deleting the determined digit in response thereto.

12. The method of claim 2, further comprising detecting an input that corresponds to a request to transmit a signal corresponding to the determined digits.

13. The method of claim 2, further comprising detecting an input that corresponds to a request to dial the determined digits and dialing the determined digits in response thereto.

14. The method of claim 13, wherein the input that corresponds to the request to dial the determined digits is a click on a click wheel button.

15. The method of claim 2, wherein performing the task includes sending the determined digits.

16. The method of claim 2, wherein performing the task corresponds to dialing a telephone number.

17. The method of claim 2, wherein performing the task corresponds to sending numeric input to a remote computer.

18. The method of claim 2, wherein the plurality of finger contacts with the click wheel excludes finger contacts, if any, for which the angular displacement is less than a minimum threshold.

19. The method of claim 2, wherein the click wheel is a physical click wheel.

20. The method of claim 2, wherein the click wheel is a virtual click wheel.

21. A graphical user interface on a portable communications device with a click wheel and a display, comprising:
    an image that includes digits arranged in a circle
    wherein:

the image rotates in response to each finger contact in a plurality of sequential finger contacts;

each finger contact includes an angular displacement of the finger contact on the click wheel between an initial location and a final location of the finger contact on the click wheel, for each finger contact, the amount of rotation of the image is determined in accordance with the angular displacement of the finger contact such that a digit of the image is highlighted in a fixed predetermined position of the circle;

for each finger contact, the highlighted digit is determined, wherein the determined highlighted digit is independent of the initial location of the finger contact on the click wheel; and a task is performed using the determined digits.

22. A portable communications device, comprising:
a click wheel;
a display;
one or more processors;
memory; and
a program, wherein the program is stored in the memory and configured to be executed by the one or more processors, the program including:
instructions for detecting a plurality of sequential finger contacts with the click wheel, wherein each finger contact includes an angular displacement of the finger contact on the click wheel between an initial location and a final location of the finger contact on the click wheel;
instructions for displaying an image that includes digits arranged in a circle, wherein the image rotates in response to each finger contact by an amount determined in accordance with the angular displacement of the finger contact such that a digit of the image is highlighted in a fixed predetermined position of the circle;
instructions for determining the highlighted digit for each finger contact, wherein the determined highlighted digit is independent of the initial location of the finger contact on the click wheel; and
instructions for performing a task using the determined digits.

23. A computer-program product, comprising:
a computer readable storage medium and a computer program mechanism embedded therein, the computer program mechanism comprising instructions, which when executed by a portable communications device with a click wheel and a display, cause the device to:
detect a plurality of sequential finger contacts with the click wheel, wherein each finger contact includes an angular displacement of the finger contact on the click wheel between an initial location and a final location of the finger contact on the click wheel;
display an image that includes digits arranged in a circle, wherein the image rotates, in response to each finger contact, by an amount determined in accordance with the angular displacement of the finger contact such that a digit of the image is highlighted in a fixed predetermined position of the circle;
for each finger contact, determine the highlighted digit, wherein the determined highlighted digit is independent of the initial location of the finger contact on the click wheel; and
perform a task using the determined digits.

24. A portable communications device with a click wheel and a display, comprising:
means for detecting a plurality of sequential finger contacts with the click wheel, wherein each finger contact includes an angular displacement of the finger contact on the click wheel between an initial location and a final location of the finger contact on the click wheel;
means for displaying an image that includes digits arranged in a circle, wherein:
the image rotates in response to each finger contact by an amount determined in accordance with the angular displacement of the finger contact such that a digit of the image is highlighted in a fixed predetermined position of the circle;
means for determining the highlighted digit for each finger contact, wherein the determined highlighted digit is independent of the initial location of the finger contact on the click wheel; and
means for performing a task using the determined digits.

* * * * *

UNITED STATES PATENT AND TRADEMARK OFFICE
CERTIFICATE OF CORRECTION

PATENT NO. : 7,667,148 B2  Page 1 of 1
APPLICATION NO. : 11/549619
DATED : February 23, 2010
INVENTOR(S) : Mansfield et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Seventh Day of December, 2010

David J. Kappos
*Director of the United States Patent and Trademark Office*